United States Patent
Murray et al.

(10) Patent No.: US 9,348,625 B2
(45) Date of Patent: May 24, 2016

(54) APPLICATION ACCESS TO NATIVE AND BUNDLED LIBRARIES

(71) Applicant: Google Inc., Mountain View, CA (US)

(72) Inventors: Timothy Murray, Mountain View, CA (US); Stephen Roderick Hines, Mountain View, CA (US); Rudy Jason Sams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/620,647

(22) Filed: Feb. 12, 2015

(65) Prior Publication Data

US 2015/0339140 A1 Nov. 26, 2015

Related U.S. Application Data

(60) Provisional application No. 62/002,326, filed on May 23, 2014.

(51) Int. Cl.
*G06F 9/45* (2006.01)
*G06F 9/455* (2006.01)
*G06F 9/445* (2006.01)

(52) U.S. Cl.
CPC .............. *G06F 9/45516* (2013.01); *G06F 8/54* (2013.01); *G06F 9/445* (2013.01); *G06F 9/455* (2013.01)

(58) Field of Classification Search
USPC .......................................................... 717/148
IPC ...................... G06F 9/45516, 9/455, 9/445, 8/54
See application file for complete search history.

(56) References Cited

U.S. PATENT DOCUMENTS

| | | | |
|---|---|---|---|
| 5,414,854 A | 5/1995 | Heninger et al. | |
| 5,613,120 A | 3/1997 | Palay et al. | |
| 5,708,811 A | 1/1998 | Arendt et al. | |
| 5,822,787 A | 10/1998 | Zucker | |
| 6,110,226 A * | 8/2000 | Bothner | G06F 8/44 717/153 |
| 6,128,590 A | 10/2000 | Stadel et al. | |
| 6,131,191 A * | 10/2000 | Cierniak | G06F 8/447 717/148 |
| 6,138,271 A | 10/2000 | Keeley | |
| 6,282,702 B1 * | 8/2001 | Ungar | G06F 9/45504 717/148 |
| 6,314,558 B1 * | 11/2001 | Angel | G06F 11/3612 717/130 |
| 6,324,687 B1 | 11/2001 | Beadle et al. | |

(Continued)

OTHER PUBLICATIONS

Grimmer et al., "An Efficient Native Function Interface for Java", Sep. 2013, ACM.*

(Continued)

*Primary Examiner* — Wei Zhen
*Assistant Examiner* — Junchun Wu
(74) *Attorney, Agent, or Firm* — McDonnell Boehnen Hulbert & Berghoff LLP

(57) ABSTRACT

An application executing on a computing device may invoke a function call of a first function. The computing device may support a bundled application library of functions and a native library of functions. It may be determined that code for executing the first function exists in both the bundled application library and the native library, and the application may execute the first function using the code in the native library. While the application continues execution on the computing device, the application may invoke a function call of a second function. It may be determined that, of the bundled application library and the native library, the code for executing the second function exists in the bundled application library. The application may execute the second function using the code in the bundled application library.

20 Claims, 7 Drawing Sheets

(56) References Cited

U.S. PATENT DOCUMENTS

| | | |
|---|---|---|
| 6,393,495 B1 | 5/2002 | Flory et al. |
| 6,513,156 B2 * | 1/2003 | Bak .................... G06F 9/45516 717/148 |
| 6,550,060 B1 | 4/2003 | Hammond |
| 6,560,774 B1 | 5/2003 | Gordon et al. |
| 6,643,657 B1 | 11/2003 | Baird et al. |
| 6,745,385 B1 | 6/2004 | Lupu et al. |
| 6,779,187 B1 | 8/2004 | Hammond |
| 7,370,360 B2 * | 5/2008 | van der Made ....... G06F 21/563 717/135 |
| 7,555,746 B2 | 6/2009 | Fleischer |
| 7,805,706 B1 | 9/2010 | Ly et al. |
| 8,001,083 B1 | 8/2011 | Offer |
| 8,015,557 B2 | 9/2011 | Chen et al. |
| 8,533,615 B1 | 9/2013 | Sams |
| 8,561,038 B1 | 10/2013 | Sams |
| 8,600,726 B1 | 12/2013 | Varshney et al. |
| 2002/0133805 A1 | 9/2002 | Pugh et al. |
| 2002/0143468 A1 | 10/2002 | Cheng et al. |
| 2003/0167463 A1 | 9/2003 | Munsil et al. |
| 2003/0187929 A1 | 10/2003 | Pugh et al. |
| 2004/0054946 A1 | 3/2004 | Atallah et al. |
| 2004/0083467 A1 * | 4/2004 | Hanley .................... G06F 8/52 717/148 |
| 2004/0143752 A1 | 7/2004 | Kumar |
| 2004/0162930 A1 | 8/2004 | Forin et al. |
| 2004/0210672 A1 | 10/2004 | Pulleyn et al. |
| 2005/0066325 A1 | 3/2005 | Mori et al. |
| 2006/0070053 A1 | 3/2006 | Andersen et al. |
| 2007/0011199 A1 | 1/2007 | Hunt et al. |
| 2007/0168957 A1 | 7/2007 | Li et al. |
| 2007/0226715 A1 * | 9/2007 | Kimura ............... G06F 9/45516 717/148 |
| 2008/0010630 A1 | 1/2008 | Ou-Yang et al. |
| 2008/0147671 A1 * | 6/2008 | Simon ............... G06F 17/30899 707/999.01 |
| 2009/0222798 A1 * | 9/2009 | Iguchi ....................... G06F 8/52 717/148 |
| 2009/0300600 A1 | 12/2009 | Sugai |
| 2010/0058302 A1 | 3/2010 | Broscaru et al. |
| 2012/0214416 A1 | 8/2012 | Kent et al. |
| 2012/0227061 A1 | 9/2012 | Hunt et al. |
| 2012/0290560 A1 | 11/2012 | Das |
| 2014/0282431 A1 * | 9/2014 | Delio, Jr. ............ G06F 11/3466 717/130 |

OTHER PUBLICATIONS

Delcambre et al. "Bundles in Captivity: An Application of Superimposed Information", 2001, IEEE.*

Bourgeois et al. "Extending executability of applications on varied target platforms", 2011, IEEE.*

Hicks, "Types and Intermediate Representations", 1998, University of Pennsylvania.*

Nvidia, Parallel Thread Execution ISA, Application Guide, v3.2, Jul. 2013, http://docs.nvidia.com/cuda/pdf/ptx_isa_3.2.pdf, 247 pages.

SPIR 1.0 Specification for Open CL, Khornos Group—OpenCL Working Group—SPIR Subgroup, Aug. 24, 2012, http://www.khronos.org/registry/cl/specs/spir_spec-1.0-provisional.pdf, pp. 1-31.

Wikipedia, Library (computing), accessed Apr. 11, 2014, http://en.wikipedia.org/wiki/Library_(computing), pp. 1-9.

Murray et al., U.S. Appl. No. 14/079,897, filed Nov. 14, 2013.

* cited by examiner

APPLICATION ACCESS TO NATIVE AND BUNDLED LIBRARIES

CROSS-REFERENCE TO RELATED APPLICATION

This application claims priority to U.S. provisional patent application Ser. No. 62/002,326, filed May 23, 2014, which is hereby incorporated by reference in its entirety.

BACKGROUND

Computing devices may incorporate one or more processors that execute machine code, including code that implements an operating system (OS). Machine code executed by a computing device may also include both application code developed either by the provider of the computing device or by a third party. To aid the development of applications, application developers may use a software development kit (SDK) and/or one or more application programming interfaces (APIs) that can be integrated into or accessed by applications that the developers create. An SDK may include a native library that provides the basic programming language functions on which application developers may rely.

SUMMARY

Each version of an operating system may be shipped with a corresponding version of a native library. On a particular device, such as a particular model of wireless communication device (WCD) or smartphone, the native library may be arranged to provide streamlined, or "customized" implementations designed specifically to execute rapidly and/or efficiently on the particular device. Thus, for instance, if version A of a native library includes a graphics function func1( ) and the particular device includes a graphics co-processor, func1( ) may make use of the graphics co-processor to improve its performance. However, on a device that does not include a graphics co-processor, a different version of func1( ) may be deployed that uses the main processor instead. A goal of such an arrangement may be to provide application developers with the same APIs regardless of the physical hardware to which their applications are targeted.

As the operating system matures, new versions of the native library may be provided. These new versions may include additional functionality, improved performance, and/or improved hardware compatibility. In some cases, for example, version B of the native library may include func2( ) a function not available in version A of the native library. In order to provide func2( ) on computing devices that support version A of the native library, applications may be compiled with, or arranged to be linked to or otherwise use, a bundled application library that contains func2( ) and potentially other functions as well.

The choice of whether to use a native library or a bundled application library has been an all-or-nothing situation. Thus, an application can either use functions in the native library, the bundled application library, but not functions from both. While this arrangement enables functionality and backwards compatibility, it can significantly reduce the performance of some functions. For instance, suppose that the bundled application library includes a non-customized version of func1( ). If an application requires use of func2( ) on a computing device with version A of the native library, the application might be required to use the bundled application library instead. Thus, the application may use the non-customized version of func1( ) from the bundled application library instead, even if the computing device that the application is executing on supports the graphics co-processor and the customized version of func1( ) in its native library.

Accordingly, in a first embodiment, an application executing on a computing device may invoke a function call of a first function. The computing device may support a bundled application library of functions and a native library of functions. It may be determined that code for executing the first function exists in both the bundled application library and the native library, and the application may execute the first function using the code in the native library. While the application continues execution on the computing device, the application may invoke a function call of a second function. It may be determined that, of the bundled application library and the native library, the code for executing the second function exists in the bundled application library. The application may execute the second function using the code in the bundled application library.

In a second example embodiment, a native library may be provided with an operating system of a computing device. The native library may be represented in machine code of the computing device. A bundled application library may also be provided with an application configured to execute on the computing device. The bundled application library may be represented in intermediate code (e.g., byte code). A first function may be supported by the both the bundled application library and the native library, and a second function may be supported by the bundled application library but not supported by the native library. The application may be configured to execute the first function using the code in the native library, and execute the second function using the code in the bundled application library.

A third example embodiment may include a non-transitory, computer-readable storage medium, having stored thereon program instructions that, upon execution by a computing device, cause the computing device to perform operations in accordance with the first and/or second example embodiments.

A fourth example embodiment may include a computing device containing at least a processor and data storage. The data storage may include program instructions that, when executed by the processor, cause the computing device to perform operations in accordance with the first and/or second example embodiments.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1A:
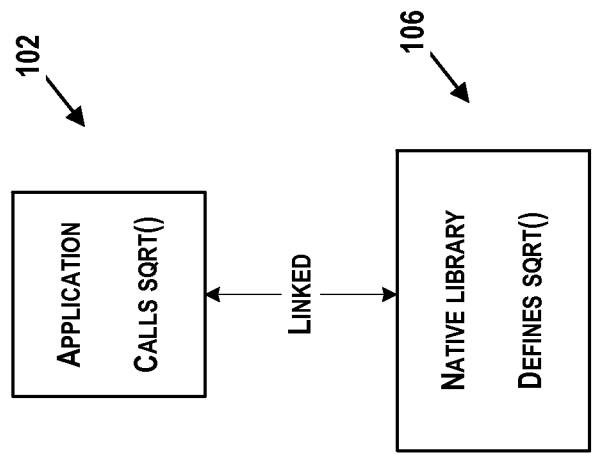
FIG. 1A depicts applications linked to libraries, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. OVERVIEW

As one way of making computer application development simpler and more tractable, common functions that multiple applications may perform can be provided in one or more separate libraries. These libraries may include source code, intermediate code (e.g., byte code or some form of object code), or machine code of a processor or processing system. In this way, these common functions can be developed and tested in an isolated environment, and may be used by one or more applications. Consequently, these applications need not implement functions that are found in the libraries.

A difference between a function implemented within an application and one in a library may be based on how the code of the application is organized. Library functions may be written in such a way that they can be used by multiple related or unrelated applications. On the other hand, a function implemented within an application might only be able to be used by that particular application.

Library functions may have well-defined interfaces, sometimes referred to as library interfaces or APIs. The interface of a particular function may characterize the formats, types, and/or quantities of input parameters taken by the function, as well as the formats, types, and/or quantities of output provided by the function. To use a library function, an application developer need only know the function's interface(s) and not necessarily know the internal details of the function.

Applications may be linked to libraries in a static or dynamic fashion. Relevant functions from static libraries may be compiled into executable applications. Therefore, those applications can use make use of the functions even if the application is executed on a platform that does on provide a library with the functions. The functions may be statically linked to the application by a linker program when the application is compiled from source and/or object code.

Dynamic libraries, on the other hand, may be linked to applications at the beginning of or during the applications' execution. The linker program may record what library routines the application uses and makes references to these routines in the appropriate dynamic libraries. The linker program may be part of the operating system or the application itself.

In some embodiments, a particular native library (e.g., a math library, a string processing library, or a graphics library) may be provided with the operating system. A bundled version of this library may also be provided with applications that use functions found in that library. In this way, applications can take advantage of native libraries that are potentially designed for enhanced performance on particular computing devices executing particular versions of the operating system. But, when these applications are deployed on a computing device that does not support certain functions in its native libraries (e.g., the computing device does not include the library or includes an older version of the native library that doesn't support the certain functions), the applications may use the functions from their bundled libraries instead.

As an example, consider a math library that contains a function, sqrt( ), that calculates the square root of a number. This function's interfaces may be defined as "float sqrt(float)". This definition indicates that the function takes a floating point number as input and returns a floating point number as output. The function may be called from an application using the command "y=sqrt(x)", where x and y are floating point variables. Thus, for instance, if x has a value of 4.0 in the application, the function will return a value of 2.0 for assignment to y.

In some math libraries, a sqrt( ) function may be implemented algorithmically in software as a series of generic program steps. The advantage to doing so is that the sqrt( ) function can be used on a wide variety of computing systems. But the disadvantage of this approach is that the performance of the sqrt( ) function is likely to be slow.

On computing devices with specialized hardware, such as a mathematics co-processor, a native (platform-specific) sqrt( ) function may be used instead. This sqrt( ) function may use the co-processor's built-in mathematical abilities to perform the square root calculations. In some cases, this might entail the co-processor using machine code, large pre-calculated tables, and/or parallel calculations to speed up the rate at which the sqrt( ) operates.

Therefore, it may be advantageous for an application to be linked to and use a native sqrt( ) function when such a function is available. But, in order to provide a sqrt( ) function on a wide variety of computing devices, including those without such platform-specific functions, a generic, software-based sqrt( ) function may be available in some math libraries bundled with applications.

In general, for each type of library (e.g., math, string processing, graphics, etc.), an application can only be linked to one version of this library. In some implementations, doing otherwise could potentially cause a linking error because an application would not know which library's version of a given math function to use.

To that point, suppose that the native math library does not contain sine and cosine functions, but the application's bundled math library does contain these functions, and the application uses these functions. Then, the application will be linked to the bundled math library, and use this library exclusively for its supported math functions. For instance, if the application uses the square root function, it will use the square root function of the bundled math library rather than that of the native library.

Figure 1A:
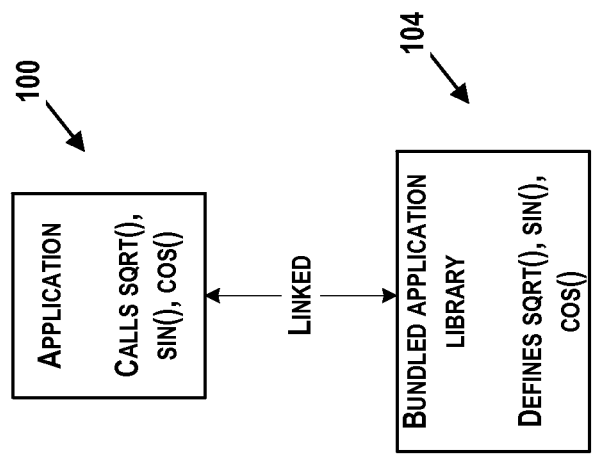

FIG. 1 provides a further illustrative example. Application 100 operates on a computing device, and calls math functions sqrt( ) sin( ) and cos( ). Application 102 may also operate on the computing device, and call math function sqrt( ). The computing device supports native library 106, which defines the sqrt( ) function. But, both application 100 and application 102 also have access to bundled application library 104, which defines the sqrt( ) sin( ) and cos( ) functions. The sin( ) function may perform the mathematical sine operation and that the cos( ) function may perform the mathematical cosine function.

Since application 100 calls functions that are not defined in native library 106, application 100 may be linked with bundled application library 104. This may result in application 100 using generic, non-customized variations of these functions. On the other hand, since native library 106 supports the function called by application 102, application 102 may be linked with native library 106. This may result in application 102 having access to a customized version of the sqrt( ) function, but no access to math functions, such as sin( ) and cos( ) not supported by native library 106.

Herein, the terms "customize," "customized," and "customization" may refer to ways in which software can be made operate more efficiently and/or in a more desirable fashion on a particular computing device or class of computing devices. These terms do not imply that the most efficient implementation or the best possible performance is obtained, only that the software has been specialized in some fashion.

The embodiments herein may facilitate an application using functions from two different versions of a particular library. For instance, the application may be bundled with a generic version of the particular library, and may invoke one or more functions in this bundled application library. The application may also have access to a native version of the library, and may also invoke one or more functions in this library as well.

Figure 1B:
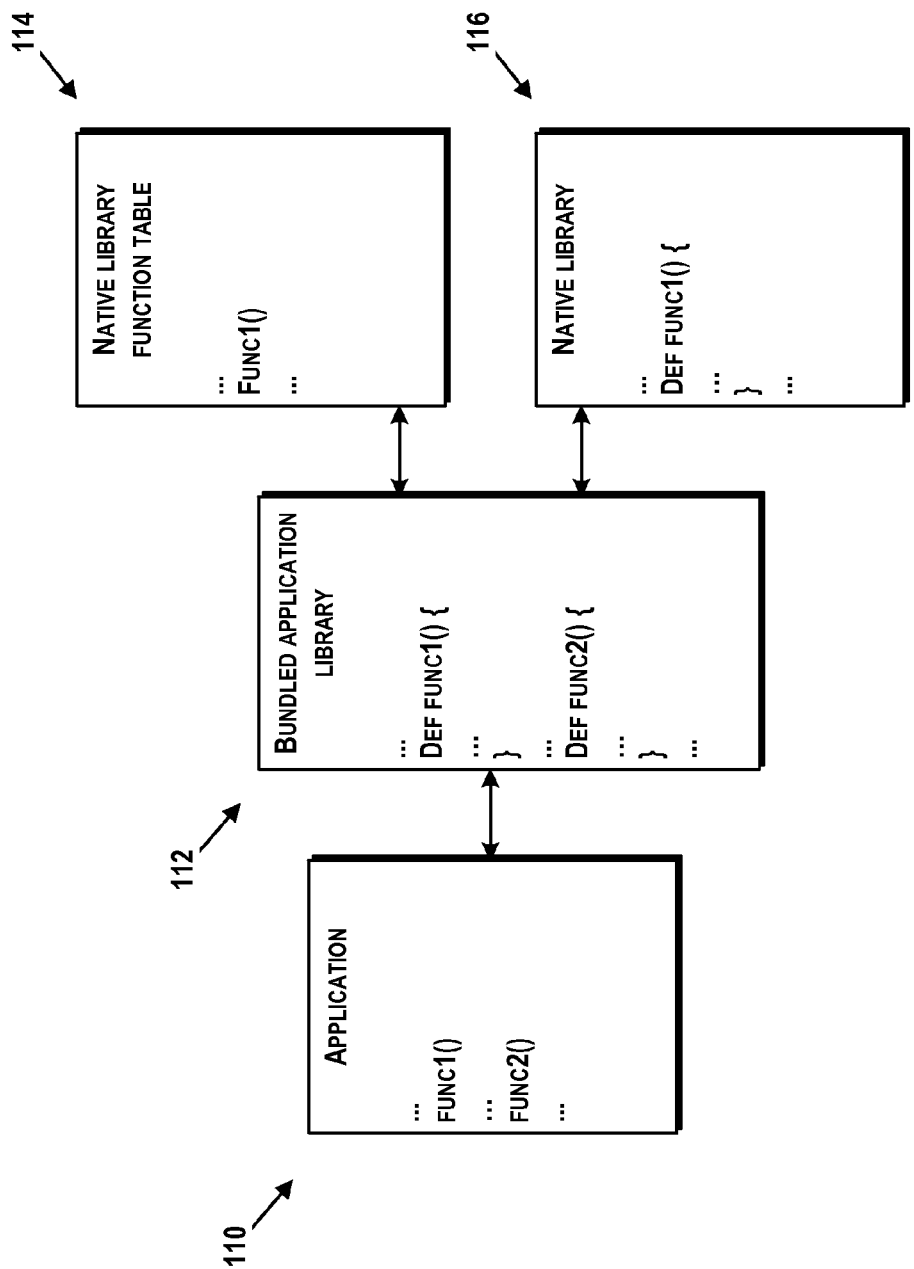
FIG. 1B depicts an application invoking functions in different versions of the same library, according to an example embodiment.

As an example, FIG. 1B depicts an application 110 that calls functions func1( ) and func2( ). Application 110 is linked to bundled application library 112, which defines func1( ) and func2( ). Thus, these functions may be executed by using the code in bundled application library 112. However, native library 116 is another version of the same library as bundled application library 112, but only defines func1( ).

Possibly to utilize advantages associated with the implementation of func1( ) in native library 116, application 110 may invoke, directly or indirectly, func1( ) in native library 116. However, since func2( ) is not defined in native library 116, application 110 may invoke func2( ) in bundled application library 112.

For instance, native library function table 114 may contain a list of functions supported by native library 116. Thus, native library function table 114 may contain an entry for func1( ), possibly amongst other entries. However, native library function table 114 might not contain an entry for func2( ).

In a possible embodiment, application 110 calls func1( ) which invokes func1( ) in bundled application library 112. Bundled application library 112 looks up func1( ) in native library function table 114, and determines that func1( ) is supported in native library 116. Then, bundled application library 112 invokes func1( ) in native library 116. Application 110 also calls func2( ) which invokes func2( ) in bundled application library 112. Bundled application library 112 looks up func2( ) in native library function table 114, and determines that func2( ) is not supported in native library 116. Accordingly, bundled application library 112 runs func2( ). Results of both functions may be passed back to application 110.

The applications and libraries of FIGS. 1A and 1B may operate on or be supported by one or more computing devices. These computing devices may be organized in a standalone fashion, in cloud-based (networked) computing environments, or in other arrangements. Non-limiting examples are provided in the next section.

2. EXAMPLE COMPUTING DEVICE AND OPERATING SYSTEM

Figure 2:
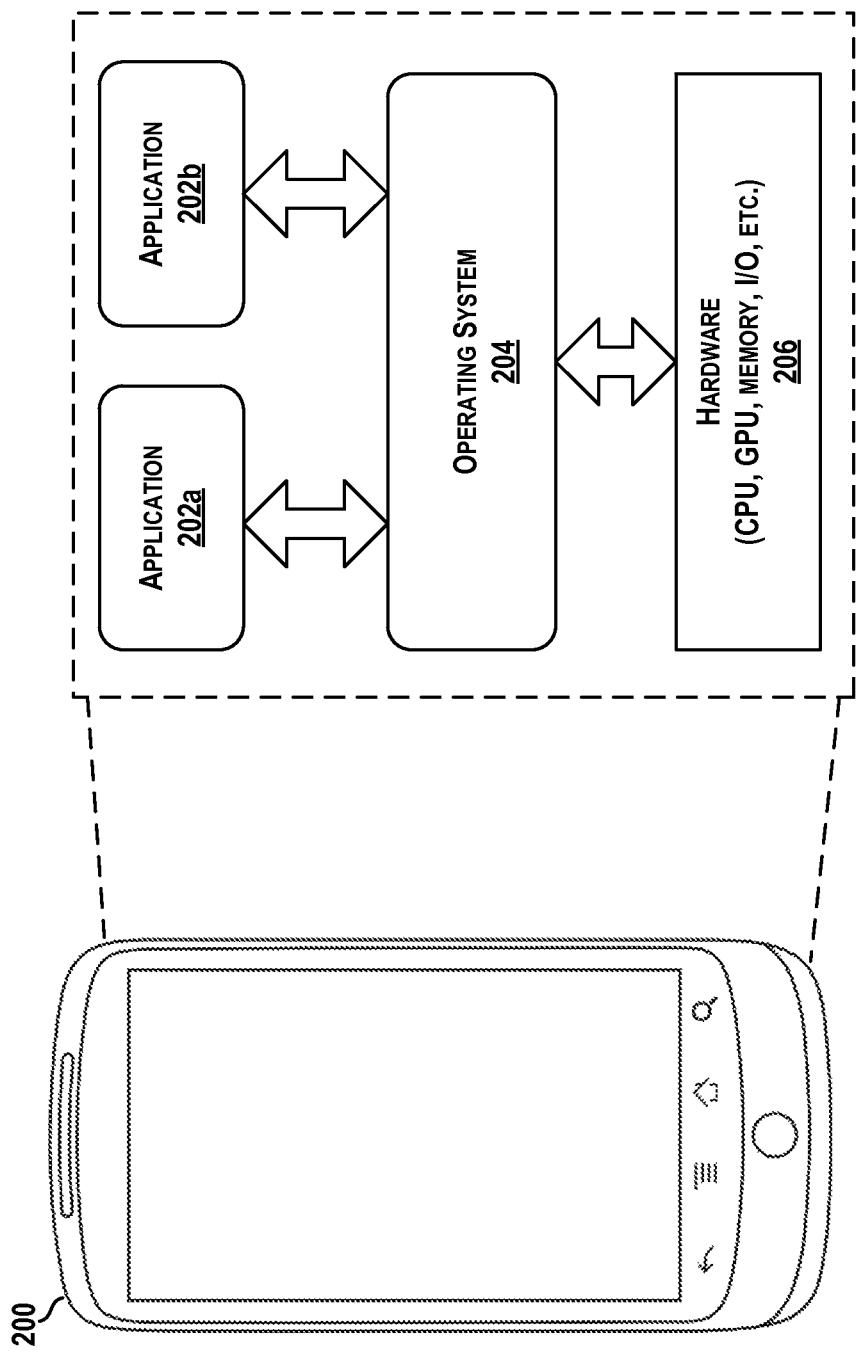
FIG. 2 illustrates a computing device, according to an example embodiment.

FIG. 2 illustrates an example computing device 200. Computing device 200 may include applications 202a and 202b and an operating system 204 being executed by hardware 206. Although example computing device 200 is in the form of a smartphone, aspects of this disclosure are applicable to other computing devices such as PCs, laptops, tablet computers, etc.

Each of applications 202a and 202b may include instructions, that when executed, cause computing device 200 to perform specific tasks or functions. Applications 202a and 202b may be native applications (i.e., installed by a manufacturer of computing device 200 and/or a manufacturer of operating system 204) or may be third-party application installed by a user of computing device 200 after purchasing the computing device.

A non-exhaustive list of example applications includes: a media player application that accepts media files as inputs and generates corresponding video and/or audio to the output device(s); an e-reader application which accepts electronic documents (books, magazines, etc.) as input and presents the content of the document via the output device(s); a feed reader that accepts feeds delivered over the Internet (e.g., RSS feeds and/or feeds from social network sites) as input and presents the feeds via the output device(s); a map application that displays a map via the output device(s); a note-taking application, a bookmarking application, and a word processing, spreadsheet, and/or presentation application that accepts specifically formatted files as inputs and presents them via the output devices for viewing and/or editing.

Operating system 204 may interact with and manage hardware 206 to provide services for applications 202a and 202b. For example, application 202a may request that operating system 204 direct an integrated camera of hardware 206 to capture a visual image and that hardware 206 store the image to memory.

Hardware 206 may include, for example, a central processing unit (CPU), a graphics processing unit (GPU), memory, an input/output (I/O) interface, user input device(s), output device(s), or other sensors. Components of hardware 206 may be controlled by instructions contained in applications 202a and 202b and operating system 204.

The CPU may be configured to effectuate the operation of the computing device 200 by executing instructions stored in memory or disk storage. Such instructions may include the operating system 204 and the applications 202a and 202b. The CPU may, for example, comprise a single or multi-core processor, an application specific integrated circuit (ASIC), field programmable gate array (FPGA), and/or any other suitable circuitry.

The GPU may be operable to generate a video stream for output to the screen based on instructions and/or data received from the CPU. That is, data structures corresponding to images to be displayed on the screen may be stored to and read from the memory or disk storage by the CPU. The CPU may convey such data structures to the graphics processor via a standardized API such as, for example, Standard Widget Toolkit (SWT), the DirectX Video Acceleration API, the Video Decode Acceleration Framework API, or another suitable API.

The memory may include program memory and run-time memory. The memory may, for example, comprise non-volatile memory, volatile memory, read only memory (ROM), random access memory (RAM), flash memory, magnetic storage, and/or any other suitable memory (which may be non-transitory media). Program memory may store instructions executable by the CPU to effectuate operation of operating system 204, and applications 202a and 202b. Runtime memory may store data generated or used during execution of operating system 204 or applications 202a and 202b.

The input/output (I/O) interface may be operable to receive signals from the input device(s), and provide corresponding signals to the CPU and/or the GPU, for example. The input device(s) may include, for example, a mouse, a touchpad, a motion sensor, a trackball, a voice recognition device, a keyboard, or any other suitable input device which enables a user to interact with computing device 200. The output devices may include, for example, a screen and speakers. The screen may be, for instance, a liquid crystal display (LCD) screen, an organic light emitting diode (OLED) screen, an e-ink screen, and/or any other suitable device for presenting a graphical user interface.

Figure 3:
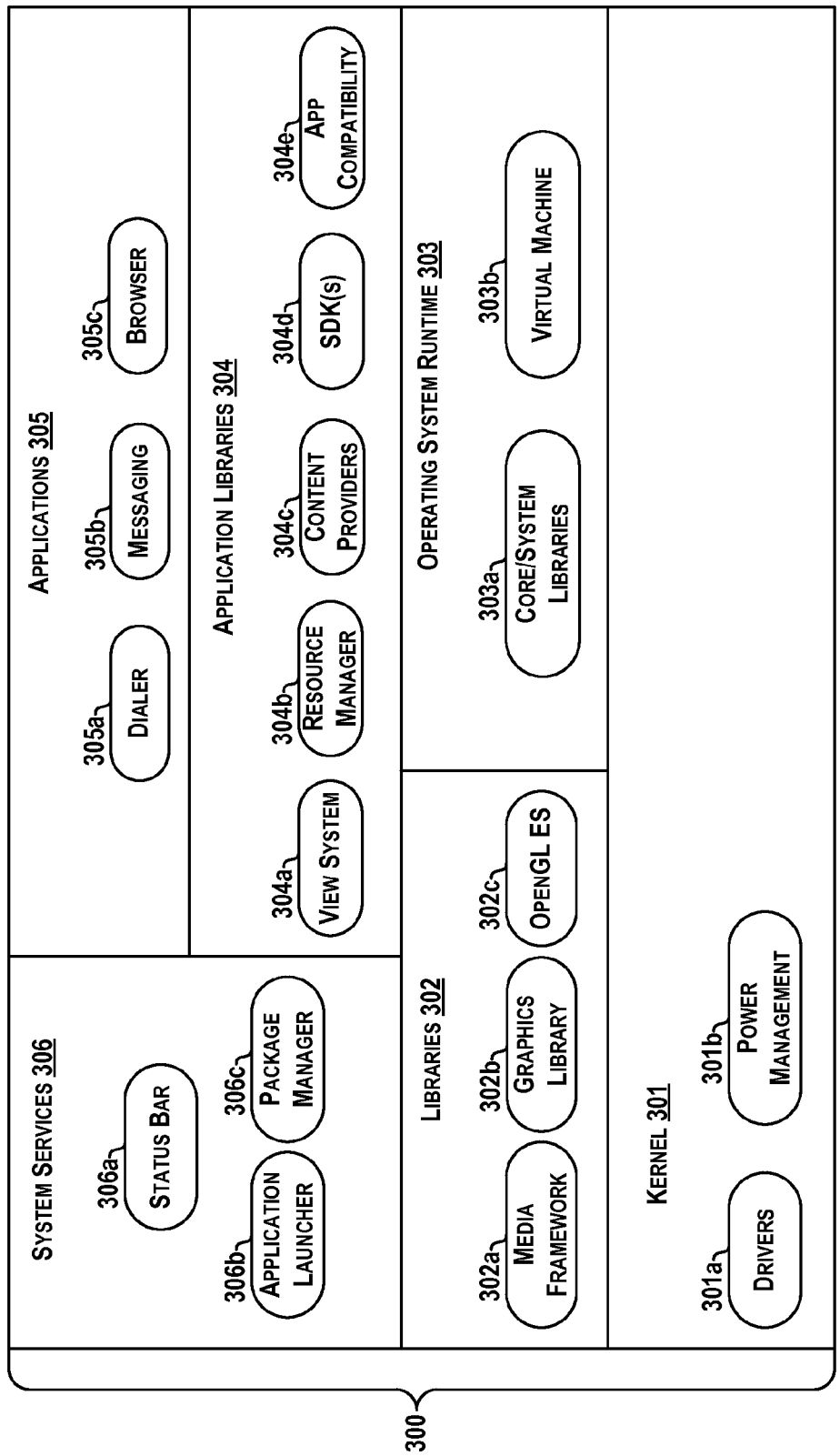
FIG. 3 is a block diagram, according to an example embodiment.

FIG. 3 is a block diagram illustrating example components of an operating system 300 used by a computing device. Operating system 300 may invoke multiple processes, while ensuring that associated applications are responsive, and that wayward applications do not cause a fault of operating system 300. Using task switching, operating system 300 may allow for the switching of applications without losing the state of each associated application. Operating system 300 may also use an application framework to enable reuse of components. Operating system 300 may generally be organized into components including a kernel 301, libraries 302, an operating system runtime 303, application libraries 304, applications 305, and system services 306.

Kernel 301 may include drivers 301a that enable software such as the operating system 300 and applications 305 to interact with input/output devices. Kernel 301 may also include power management processes 301b that coordinate hardware power usage and provide alerts when an integrated battery is running low on power, for example. Kernel 301 may also provide memory management and process scheduling functions.

Libraries 302 may include several subcomponents, such as media framework 302a, graphics library 302b, and OpenGL ES 302c. Media framework 302a may include functionality that supports standard video, audio and still-frame formats. Graphics library 302b may support two-dimensional graphics rendering. OpenGL ES 302c may support gaming and three-dimensional graphics rendering.

Operating system runtime 303 may include core/system libraries 303a and virtual machines 303b. Virtual machines 303b may be custom virtual machines that run a customized file format. Virtual machines 303b may be used with an embedded environment since virtual machines 303b use runtime memory efficiently, implement a CPU optimized byte code interpreter, and support multiple virtual machine processes per device.

Application libraries 304 may include libraries for view system 304a, resource manager 304b, and content providers 304c. These application libraries may provide support for applications 305. Application libraries 304 may also include SDKs 304d and app compatibility 304e, both of which may be associated with or used by applications 305 to perform functions of the applications 305. Either core/system libraries 303a, application libraries 304, or both may be considered native libraries.

SDKs 304d may further adapt applications 305 to be able to communicate with one or more pieces of code or functions in operating system 300. As an example, an application may incorporate an SDK that may adapt the application to be able to communicate with one or more content servers. A content server may provide advertisements, and the content SDK may include information about where to get the advertisements, for example, an address of the content server.

Applications 305 may include any number of applications, and examples include dialer 305a, messaging 305b, and browser 305c. Dialer 305a may provide functionality related to placing or receiving phone calls. Messaging 305b may provide functionality related to receiving and sending messages, such as email, voice mail, or text messages. Browser 305c may provide functionality related to sending or receiving information via the World Wide Web. Many other types of applications exist as well and may be downloaded and installed on a computing device.

System services 306 may include status bar 306a, application launcher 306b, and package manager 306c. Status bar 306a may provide functionality related to providing system notifications. Application launcher 306b may provide functionality related to organization and execution of applications 305. Package manager 306c may maintain information for installed applications 305.

3. EXAMPLE INFORMATION FLOW DIAGRAMS

Figure 4:
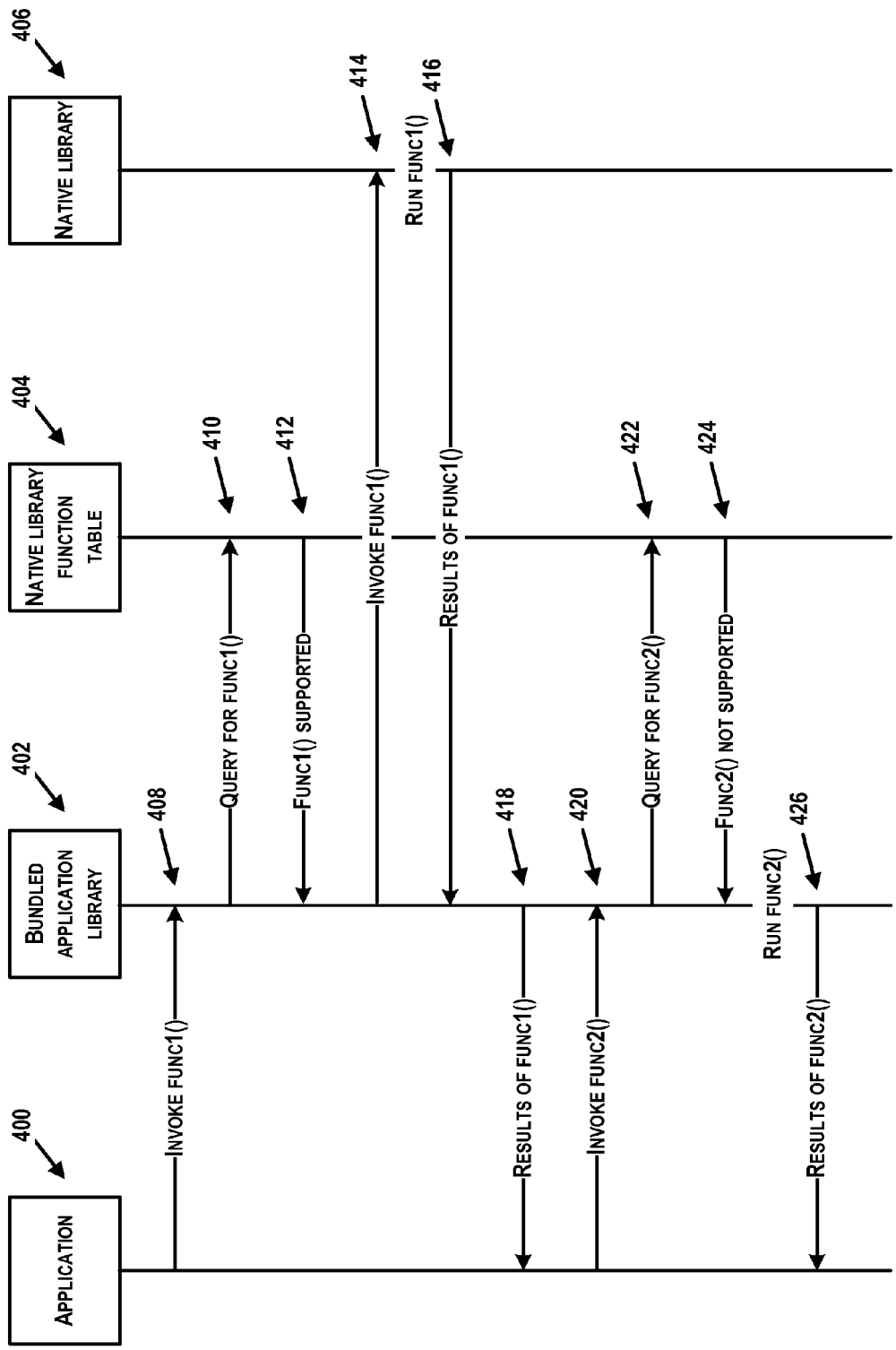
FIG. 4 is an information flow diagram, according to an example embodiment.
Figure 5:
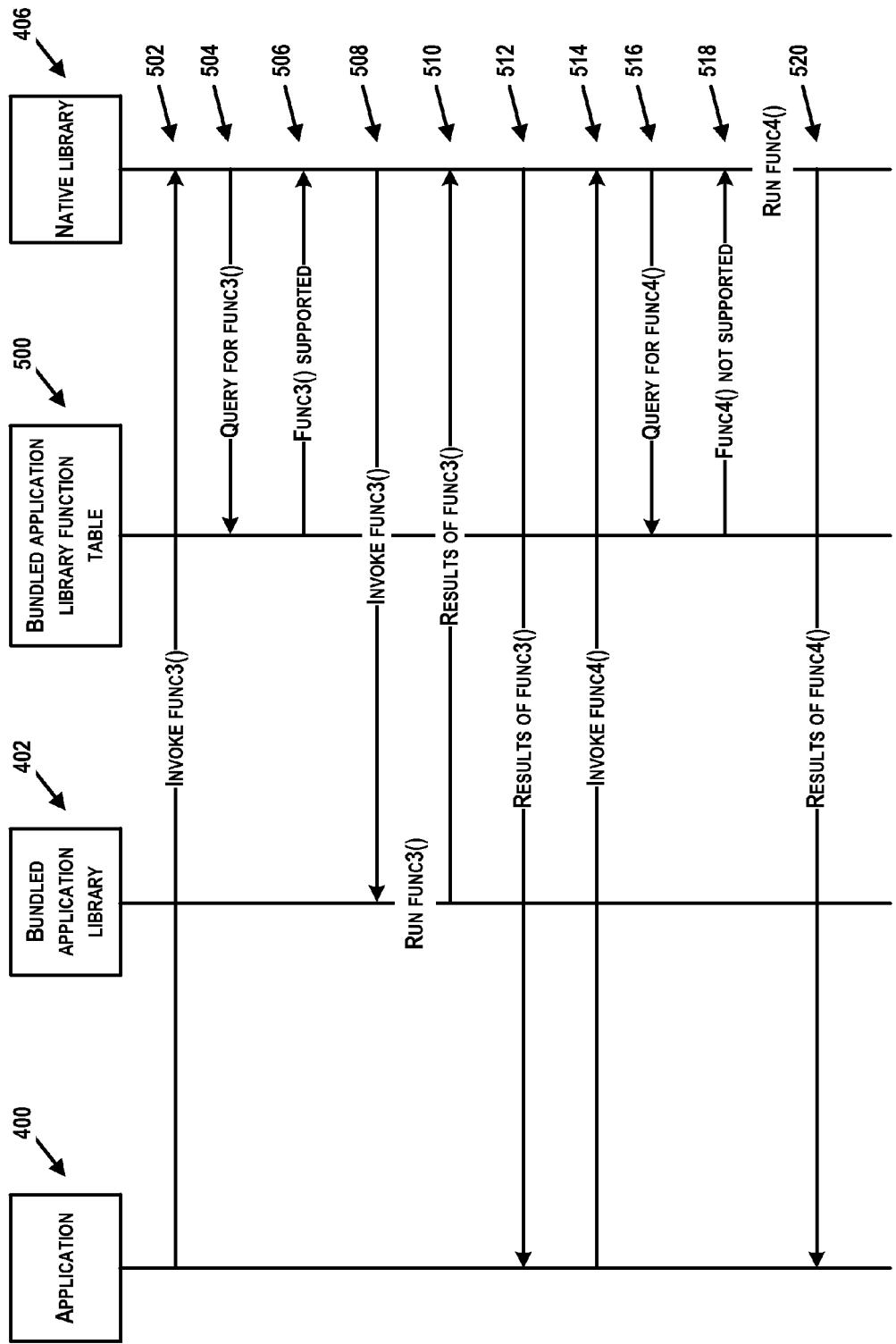
FIG. 5 is another information flow diagram, according to an example embodiment.

FIGS. 4 and 5 provide example information flows that may support various ways of allowing an application to use functions from two different versions of a particular library. For instance, the application may be bundled with a generic version of the particular library, and may invoke, directly or indirectly, one or more functions in this bundled application library. The application may also have access to a native version of the library, and may also invoke, directly or indirectly, one or more functions in this library as well.

In FIG. 4, application 400, bundled application library 402, native library function table 404, and native library 406 may be stored on and/or configured to operate on a particular computing device. Native library function table 404 and native library 406 may be separate modules or combined in the same module. In distributed environments, some of these components may be on different computing devices and may communicate with one another, for instance, over a network.

In FIG. 4, application 400 is linked to bundled application library 402, and bundled application library 402 is in communication with native library 406. In this way, application 400 may be able to invoke functions in both of these versions of the particular library. Native library function table 404 may include a list of functions supported by native library 406 and possibly references to the locations of these functions in memory.

At step 408, application 400 may invoke function func1( ). For instance, application 400 may call this function with zero or more parameters. Bundled application library 402 may support func1( ) and may be able to run func1( ) to provide a result to application 400. However, if bundled application library 402 is a generic version of the particular function, it may be beneficial to determine whether another version of func1( ) exists in native library 406. For instance, such a native version of func1( ) may be customized for operation on the computing device.

Thus, at step 410, bundled application library 402 may query native library function table 404 for func1( ). At step 412, native library function table 404 may indicate to bundled application library 402 that native library 406 supports func1( ).

Then, at step 414, bundled application library 402 may invoke func1( ) in native library 406. For instance, bundled application library 402 may call func1( ) with the same, more, or fewer parameters as were used in step 408. In response to this invocation, native library 406 may run func1( ) with these parameters. At step 416, the results of running func1( ) may be provided to bundled application library 402, and at step 418, these results may be provided to application 400. The results may include any changes to parameters made by native library 406, and/or the determination of a return value.

In some cases, like the one encompassing steps 408-418, the presence of a function in a particular library may be checked for in both a bundled application library and a native library, but preference may be given to the version supported by the native library. In other cases, preference may be given to the version in the bundled application library. For instance, in some cases, the implementation of the function in the native library may have known limitations or defects, and the version in the bundled application library may overcome these limitations or defects. Therefore, any performance degradation due to using the version of the function in the bundled application library may be offset by its greater reliability or robustness. Alternatively, the function might not be supported in the native library.

While application 400 is still running (and perhaps while func1( ) is being invoked), at step 420 application 400 may invoke func2( ). Application 400 may call this function with zero or more parameters. Bundled application library 402 may support func2( ) and may be able to run func2( ) to provide a result to application 400. However, as was the case for func1( ) it may be beneficial to determine whether another version of func2( ) exists in the native version of the library.

Thus, at step 422, bundled application library 402 may query native library function table 404 for func2( ). At step 424, native library function table 404 may indicate to bundled application library 402 that native library 406 does not supports func2( ).

In this case, bundled application library 402 may run func2( ) with the provided parameters. At step 426, the results of running func2( ) may be provided to application 400. The results may include any changes to parameters made by bundled application library 402, and/or the determination of a return value.

In FIG. 5, application 400, bundled application library 402, bundled application library function table 500, and native library 406 may be stored on and/or configured to operate on a particular computing device. Bundled application library 402 and bundled application library function table 500 may be separate modules or combined in the same module. In distributed environments, some of these components may be on different computing devices and may communicate with one another, for instance, over a network.

In FIG. 5, application 400 is linked to native library 406, and native library 406 is in communication with bundled application library 402. In this way, application 400 may be able to invoke functions in both of these versions of the particular library. Bundled application library function table 500 may include a list of functions supported by bundled application library 402 and possibly references to the locations of these functions in memory.

At step 502, application 400 may invoke function func3( ). For instance, application 400 may call this function with zero or more parameters. Native library 406 may support func3( ) and may be able to run func3( ) to provide a result to application 400. Alternatively, native library 406 might not support func3( ). Regardless, it may be beneficial to determine whether another version of func3( ) exists in bundled application library 402. For instance, in some cases, the version of the function in bundled application library 402 may support more features than the one in native library 406, or may be more reliable or robust.

Thus, at step 504, native library 406 may query bundled application library function table 500 for func3( ). At step 506, bundled application library function table 500 may indicate to native library 406 that bundled application library 402 supports func3( ). In some embodiments, bundled application library function table 500 may also contain information that helps native library 406 determine whether to run its own version of func3( ). This information may include, for example, a version number for the version of func3( ) supported by bundled application library 402.

At step 508, native library 406 may invoke func3( ) in bundled application library 402. For instance, native library 406 may call func3( ) with the same, more, or fewer parameters as were used in step 502. In response to this invocation, bundled application library 402 may run func3( ) with these parameters. At step 510, the results of running func3( ) may be provided to native library 406, and at step 512, these results may be provided to application 400. The results may include any changes to parameters made by bundled application library 402, and/or the determination of a return value.

While application 400 is still running (and perhaps while func3( ) is being invoked), at step 514 application 400 may invoke func4( ). Application 400 may call this function with zero or more parameters. Native library 406 may support func4( ) and may be able to run func4( ) to provide a result to application 400. However, as was the case for func3( ), it may be beneficial to determine whether another version of func4( ) exists in bundled application library 402.

Thus, at step 516, native library 406 may query bundled application library function table 500 for func4( ). At step 518, bundled application library function table 500 may indicate to native library 406 that bundled application library 402 does not support func4( ).

In this case, native library 406 may run func4( ) with the provided parameters. At step 520, the results of running func4( ) may be provided to application 400. The results may include any changes to parameters made by bundled application library 402, and/or the determination of a return value.

For the operations illustrated by FIGS. 4 and 5, the communication between bundled application library 402 and native library 406 may involve passing data and/or references to data between these libraries. For instance, at step 414, when bundled application library 402 invokes func1( ) in native library 406, bundled application library 402 may provide a reference to or a copy of the data stored in each parameter passed to func1( ). Similarly, at step 516, when native library 406 invokes func4( ) in bundled application library 402, native library 406 may provide a reference to or a copy of the data stored in each parameter passed to func4( ).

In situations where a reference (e.g., a pointer) to the data is passed as a parameter, the library that runs the function may manipulate the data via the pointer. In the case where a copy of the data is passed, the library that runs the function may manipulate the copy of the data directly, and may pass the manipulated copy back to the invoking function. The invoking function may then replace the original version of the data with at least some of the copy.

Furthermore, either or both of bundled application library 402 and native library 406 may be represented in byte code. In some implementations, byte code may form an instruction set that can be executed by a software interpreter. Byte code may be executed by a virtual machine by parsing and directly translating the byte code instructions into machine language at runtime. Often referred to as "just-in-time" compilation, the virtual machine may be specific to a particular type of computing device, but the byte code may maintain its portability between different types of computing devices. Examples of programming languages that may use byte code based virtual machines are Java, Python, and PHP.

4. EXAMPLE OPERATIONS

Figure 6:
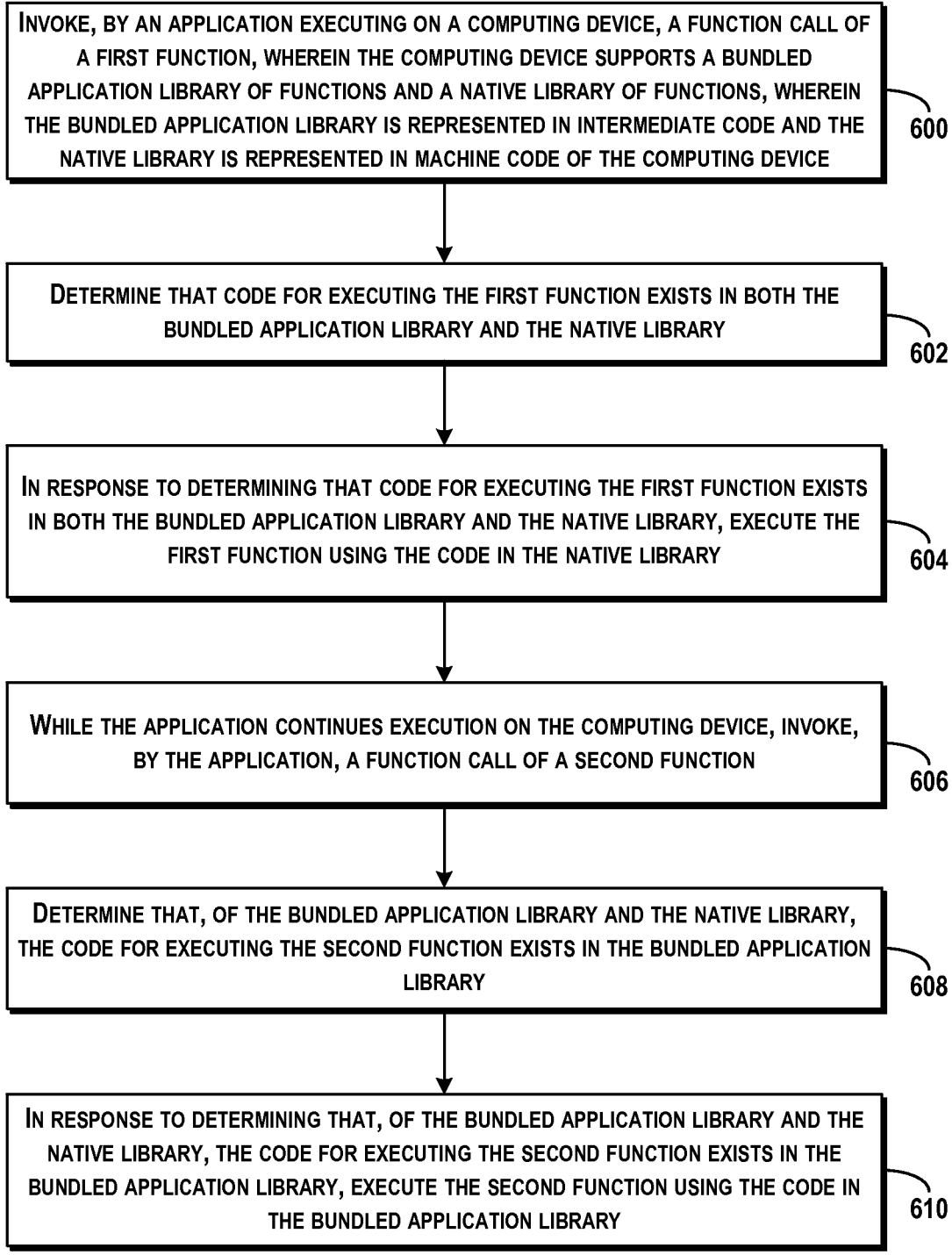
FIG. 6 is a flow chart, according to an example embodiment.

FIG. 6 is a flow chart illustrating an example embodiment. The embodiment illustrated by FIG. 6 may be carried out by a computing device, such as computing device 200. However, the embodiment can be carried out by other types of devices or device subsystems. Further, the embodiment may be combined with one or more features disclosed in the context of any previous figures.

At block 600, an application executing on a computing device may invoke a function call of a first function. The computing device may support a bundled application library of functions and a native library of functions. The bundled application library may be represented in intermediate code and the native library may be represented in machine code of the computing device. The bundled application library may be provided with the application and the native library may be provided with the operating system of the computing device. In some embodiments, the bundled application library and the native library may be different versions of the same library, and may define at least some of the same functions.

At block 602, it may be determined that code for executing the first function exists in both the bundled application library and the native library. At block 604, possibly in response to determining that code for executing the first function exists in both the bundled application library and the native library, the first function may be executed using the code in the native library. Executing the first function may involve linking, by a linker application executing on the computing device, the application with at least some of the machine code of the native library.

At block 606, while the application continues execution on the computing device, the application may invoke a function call of a second function. At block 608, it may be determined that, of the bundled application library and the native library, the code for executing the second function exists in the bundled application library. For instance, the second function might not be defined or supported by the native library.

At block 610, in response to determining that, of the bundled application library and the native library, the code for executing the second function exists in the bundled application library, the second function may execute using the code in the bundled application library. In some embodiments, executing the second function using the code in the bundled application library may involve compiling, by a just-in-time compiler application executing on the computing device, the intermediate code into a unit of machine code, and linking, by a linker application executing on the computing device, the application with at least part of the unit of machine code.

Determining that code for executing the first function exists in both the bundled application library and the native library may involve passing invocation of the function call of the first function to the bundled application library. The bundled application library may determine that code for executing the first function exists in the bundled application library. The bundled application library may query a function table associated with the native library, and then receive an indication that the first function exists in the function table.

Determining that, of the bundled application library and the native library, the code for executing the second function exists in the bundled application library may involve passing invocation of the function call of the second function to the bundled application library. The bundled application library may determine that code for executing the second function exists in the bundled application library. The bundled application library may query the function table associated with the native library, and receive an indication that the second function does not exist in the function table.

Alternatively, determining that code for executing the first function exists in both the bundled application library and the native library may involve passing invocation of the function call of the first function to the native library. The native library may determine that code for executing the first function exists in the native library. The native library may query a function table associated with the bundled application library, and then receive an indication that the first function exists in the function table and that the function table indicates that the first function in the bundled application library is compatible with the first function in the native library.

Further, determining that, of the bundled application library and the native library, the code for executing the second function exists in the bundled application library may involve passing invocation of the function call of the second function to the native library. The native library may determine that code for executing the second function does not exist in the native library. The native library may query the function table associated with the bundled application library, and then receive an indication that the second function exists in the function table.

Executing the first function using the code in the native library may involve requesting, by the bundled application library, access to data associated with the first function. The data may be accessible to the native library. The bundled application library may receive a pointer to the data from the native library, modify the data via the pointer, and release access to the data. Alternatively, executing the first function using the code in the native library may involve requesting, by the bundled application library, access to data associated with the first function. The data may be accessible to the native library. The bundled application library may receive a copy of the data from the native library, modify the copy of the data, and provide the copy of the data to the native library.

Moreover, a computing device, such as computing device 200, may be configured to support the process illustrated by FIG. 6. For instance, the computing device may include a native library provided with an operating system of the computing device. In some embodiments, the native library may be represented in machine code of the computing device.

The computing device may also be configured to support a bundled application library provided with an application configured to execute on the computing device. The bundled application library may be represented in intermediate code. A first function may be supported by the both the bundled application library and the native library and a second function may be supported by the bundled application library but not supported by the native library.

The computing device may also be configured to support the application. The application, in turn, may be configured to execute the first function using the code in the native library, and to execute the second function using the code in the bundled application library.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
   invoking, by an application executing on a computing device, a function call of a first function, wherein the computing device supports a bundled application library of functions and a native library of functions, wherein the bundled application library is represented in intermediate code and the native library is represented in machine code of the computing device;
   determining, by the computing device, that code for executing the first function exists in both the bundled application library and the native library;
   in response to determining that code for executing the first function exists in both the bundled application library and the native library, executing the first function using the code in the native library;
   while the application continues execution on the computing device, invoking, by the application, a function call of a second function;
   determining that, of the bundled application library and the native library, the code for executing the second function exists in the bundled application library but not in the native library; and
   in response to determining that, of the bundled application library and the native library, the code for executing the second function exists in the bundled application library but not in the native library, executing the second function using the code in the bundled application library.

2. The method of claim 1, wherein executing the second function using the code in the bundled application library comprises:
   compiling, by a just-in-time compiler application executing on the computing device, the intermediate code into a unit of machine code; and
   linking, by a linker application executing on the computing device, the application with at least part of the unit of machine code.

3. The method of claim 2, wherein executing the first function comprises:
   linking, by the linker application executing on the computing device, the application with at least some of the machine code of the native library.

4. The method of claim 1, wherein determining that code for executing the first function exists in both the bundled application library and the native library comprises:
   passing, by the computing device, invocation of the function call of the first function to the bundled application library;
   determining, by the bundled application library, that code for executing the first function exists in the bundled application library;
   querying, by the bundled application library, a function table associated with the native library; and
   receiving, by the bundled application library, an indication that the first function exists in the function table.

5. The method of claim 4, wherein determining that, of the bundled application library and the native library, the code for executing the second function exists in the bundled application library but not in the native library comprises:

passing, by the computing device, invocation of the function call of the second function to the bundled application library;

determining, by the bundled application library, that code for executing the second function exists in the bundled application library;

querying, by the bundled application library, the function table associated with the native library; and receiving, by the bundled application library, an indication that the second function does not exist in the function table.

6. The method of claim 1, wherein determining that code for executing the first function exists in both the bundled application library and the native library comprises:

passing, by the computing device, invocation of the function call of the first function to the native library;

determining, by the native library, that code for executing the first function exists in the native library;

querying, by the native library, a function table associated with the bundled application library; and receiving, by the native library, an indication that the first function exists in the function table and that the function table indicates that the first function in the bundled application library is compatible with the first function in the native library.

7. The method of claim 6, wherein determining that, of the bundled application library and the native library, the code for executing the second function exists in the bundled application library but not in the native library comprises:

passing, by the computing device, invocation of the function call of the second function to the native library;

determining, by the native library, that code for executing the second function does not exist in the native library;

querying, by the native library, the function table associated with the bundled application library; and receiving, by the native library, an indication that the second function exists in the function table.

8. The method of claim 1, wherein executing the first function using the code in the native library comprises:

requesting, by the bundled application library, access to data associated with the first function, wherein the data is accessible to the native library;

receiving, by the bundled application library, a pointer to the data from the native library;

modifying, by the bundled application library, the data via the pointer; and releasing, by the bundled application library, access to the data.

9. The method of claim 1, wherein executing the first function using the code in the native library comprises:

requesting, by the bundled application library, access to data associated with the first function, wherein the data is accessible to the native library;

receiving, by the bundled application library, a copy of the data from the native library;

modifying, by the bundled application library, the copy of the data; and providing, by the bundled application library, the copy of the data to the native library.

10. The method of claim 1, wherein the bundled application library is provided with the application and the native library is provided with the operating system of the computing device.

11. An article of manufacture including a non-transitory computer-readable medium, having stored thereon program instructions that, upon execution by a computing device, cause the computing device to perform operations comprising:

invoking, by an application executing on the computing device, a function call of a first function, wherein the computing device supports a bundled application library of functions and a native library of functions, wherein the bundled application library is represented in intermediate code and the native library is represented in machine code of the computing device;

determining that code for executing the first function exists in both the bundled application library and the native library;

in response to determining that code for executing the first function exists in both the bundled application library and the native library, executing the first function using the code in the native library;

while the application continues execution on the computing device, invoking, by the application, a function call of a second function;

determining that, of the bundled application library and the native library, the code for executing the second function exists in the bundled application library but not in the native library; and in response to determining that, of the bundled application library and the native library, the code for executing the second function exists in the bundled application library but not in the native library, executing the second function using the code in the bundled application library.

12. The article of manufacture of claim 11, wherein executing the second function using the code in the bundled application library comprises:

compiling, by a just-in-time compiler application executing on the computing device, the intermediate code into a unit of machine code; and linking, by a linker application executing on the computing device, the application with at least part of the unit of machine code.

13. The article of manufacture of claim 12, wherein executing the first function comprises:

linking, by the linker application executing on the computing device, the application with at least some of the machine code of the native library.

14. The article of manufacture of claim 11, wherein determining that code for executing the first function exists in both the bundled application library and the native library comprises:

passing, by the computing device, invocation of the function call of the first function to the bundled application library;

determining, by the bundled application library, that code for executing the first function exists in the bundled application library;

querying, by the bundled application library, a function table associated with the native library; and receiving, by the bundled application library, an indication that the first function exists in the function table.

15. The article of manufacture of claim 14, wherein determining that, of the bundled application library and the native library, the code for executing the second function exists in the bundled application library but not in the native library comprises:

passing, by the computing device, invocation of the function call of the second function to the bundled application library;

determining, by the bundled application library, that code for executing the second function exists in the bundled application library;

querying, by the bundled application library, the function table associated with the native library; and receiving, by the bundled application library, an indication that the second function does not exist in the function table.

16. The article of manufacture of claim 11, wherein determining that code for executing the first function exists in both the bundled application library and the native library comprises:

passing, by the computing device, invocation of the function call of the first function to the native library;

determining, by the native library, that code for executing the first function exists in the native library;

querying, by the native library, a function table associated with the bundled application library; and receiving, by the native library, an indication that the first function exists in the function table and that the function table indicates that the first function in the bundled application library is compatible with the first function in the native library.

17. The article of manufacture of claim 16, wherein determining that, of the bundled application library and the native library, the code for executing the second function exists in the bundled application library but not in the native library comprises:

passing, by the computing device, invocation of the function call of the second function to the native library;

determining, by the native library, that code for executing the second function does not exist in the native library;

querying, by the native library, the function table associated with the bundled application library; and receiving, by the native library, an indication that the second function exists in the function table.

18. The article of manufacture of claim 11, wherein executing the first function using the code in the native library comprises:

requesting, by the bundled application library, access to data associated with the first function, wherein the data is accessible to the native library;

receiving, by the bundled application library, a pointer to the data from the native library;

modifying, by the bundled application library, the data via the pointer; and releasing, by the bundled application library, access to the data.

19. The article of manufacture of claim 11, wherein executing the first function using the code in the native library comprises:

requesting, by the bundled application library, access to data associated with the first function, wherein the data is accessible to the native library;

receiving, by the bundled application library, a copy of the data from the native library;

modifying, by the bundled application library, the copy of the data; and providing, by the bundled application library, the copy of the data to the native library.

20. A computing device comprising:

a processor;

a native library provided with an operating system of the computing device, wherein the native library is represented in machine code of the processor;

a bundled application library provided with an application configured to execute on the computing device, wherein the bundled application library is represented in intermediate code, and wherein a first function is supported by the both the bundled application library and the native library and a second function is supported by the bundled application library but not supported by the native library; and the application, wherein the application is configured to execute the first function using the code in the native library in response to determination that the first function is supported by the both the bundled application library and the native library, and execute the second function using the code in the bundled application library in response to determination that the second function is supported by the bundled application library but not supported by the native library.

* * * * *